/

US008963483B2

(12) United States Patent
Kim (10) Patent No.: US 8,963,483 B2
(45) Date of Patent: Feb. 24, 2015

(54) CHARGING STAND, CHARGING SYSTEM, AND CHARGING METHOD THEREOF USING RFID TAG BATTERY SEPARATION INFORMATION

(75) Inventor: Bum Youl Kim, Anyang-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 396 days.

(21) Appl. No.: 13/455,012

(22) Filed: Apr. 24, 2012

(65) Prior Publication Data

US 2012/0280654 A1 Nov. 8, 2012

(30) Foreign Application Priority Data

May 2, 2011 (KR) ........................ 10-2011-0041715

(51) Int. Cl.
*H02J 7/00* (2006.01)
*H01M 10/44* (2006.01)
*B60L 11/18* (2006.01)

(52) U.S. Cl.
CPC ............ *H01M 10/44* (2013.01); *B60L 11/1846* (2013.01); *H02J 7/0004* (2013.01)
USPC ............ 320/106; 320/109; 320/115; 320/107

(58) Field of Classification Search
CPC ..... Y02T 90/12; Y02T 90/1169; Y02T 90/28; Y02T 90/14; Y02T 60/12
USPC .................................. 320/106–107, 109, 115
See application file for complete search history.

(56) References Cited

U.S. PATENT DOCUMENTS

| 7,119,686 | B2* | 10/2006 | Bertness et al. ........... 340/572.1 |
|---|---|---|---|
| 7,400,253 | B2* | 7/2008 | Cohen ........................ 340/572.1 |
| 7,642,742 | B2* | 1/2010 | Curello et al. ................ 320/101 |
| 7,710,069 | B2* | 5/2010 | McCollough .................. 320/108 |
| 7,952,325 | B2* | 5/2011 | Baxter et al. .................. 320/109 |
| 8,285,607 | B2* | 10/2012 | Danilewitz ...................... 705/28 |
| 8,344,685 | B2* | 1/2013 | Bertness et al. .............. 320/104 |
| 8,471,706 | B2* | 6/2013 | Schuster et al. ........... 340/572.1 |
| 8,487,584 | B2* | 7/2013 | Taylor-Haw et al. ......... 320/109 |
| 8,593,258 | B2* | 11/2013 | Cheng ........................ 340/10.42 |
| 8,616,457 | B2* | 12/2013 | Krawczewicz et al. ....... 235/492 |
| 8,704,483 | B2* | 4/2014 | Bertness et al. .............. 320/104 |
| 8,725,330 | B2* | 5/2014 | Failing ............................ 701/22 |
| 2004/0080299 | A1* | 4/2004 | Forster et al. .................. 320/114 |
| 2008/0018307 | A1* | 1/2008 | McCollough ................. 320/167 |
| 2009/0184165 | A1* | 7/2009 | Bertness et al. ........... 235/462.01 |

(Continued)

FOREIGN PATENT DOCUMENTS

CN 201063170 5/2008
CN 101496251 7/2009

(Continued)

*Primary Examiner* — Stacy Whitmore
(74) *Attorney, Agent, or Firm* — Lee, Hong, Degerman, Kang & Waimey (57) ABSTRACT

A charging system is provided. The charging system includes: a charging stand for obtaining vehicle information from the vehicle and transmitting the obtained vehicle information to a management server, and supplying power to a battery equipped in the vehicle on the basis of the transmitted vehicle information; and the management server for determining a charging condition of the battery equipped in the vehicle by using the vehicle information transmitted through the charging stand, and transmitting charging information corresponding to the determined charging condition to the charging stand.

16 Claims, 5 Drawing Sheets

(56) References Cited

U.S. PATENT DOCUMENTS

| | | | |
|---|---|---|---|
| 2009/0251300 A1* | 10/2009 | Yasuda et al. | 340/426.1 |
| 2010/0013434 A1* | 1/2010 | Taylor-Haw et al. | 320/109 |
| 2010/0060452 A1* | 3/2010 | Schuster et al. | 340/572.1 |
| 2010/0207588 A1* | 8/2010 | Lowenthal et al. | 320/165 |
| 2010/0277288 A1* | 11/2010 | Cheng | 340/10.42 |
| 2011/0156640 A1* | 6/2011 | Moshfeghi | 320/108 |
| 2011/0249394 A1* | 10/2011 | Nielsen et al. | 361/679.41 |
| 2012/0109402 A1* | 5/2012 | Shelton et al. | 700/297 |
| 2012/0109797 A1* | 5/2012 | Shelton et al. | 705/34 |
| 2013/0204474 A1* | 8/2013 | Gyenes et al. | 701/22 |
| 2014/0028243 A1* | 1/2014 | Rayner | 320/103 |

FOREIGN PATENT DOCUMENTS

| | | |
|---|---|---|
| CN | 101860062 | 10/2010 |
| CN | 101950998 | 1/2011 |
| WO | 2007/141543 | 12/2007 |

* cited by examiner

CHARGING STAND, CHARGING SYSTEM, AND CHARGING METHOD THEREOF USING RFID TAG BATTERY SEPARATION INFORMATION

CROSS-REFERENCE TO RELATED APPLICATIONS

Pursuant to 35 U.S.C. §119(a), this application claims the benefit of earlier filing date and right of priority to Korean Patent Application No. 10-2011-0041715, filed on May. 2, 2011, the contents of which is hereby incorporated by reference herein in its entirety.

BACKGROUND

The present disclosure relates to a charging system, and more particularly, to a charging system for restricting a charging operation of an illegal vehicle and a charging method using the same.

Up to now, although vehicles making use of energy such as a fossil fuel including gas, diesel, and liquefied petroleum gas account for a great portion of vehicles manufactured, sold, and driven all over the world in general tendency, due to issues relating to the prediction of exhaustion of limited oil resources, its drastic price increase, and environmental destruction caused by pollution from noxious exhaust gas and global warming, vehicles using eco-friendly alternative energy have been actively in progress at home and abroad, and extensively and gradually distributed until now.

Such alternative energy vehicles include a pure Electric Vehicle (EV), a Hybrid Electric Vehicle (HEV) making use of both fossil fuel and electric energy, and a Fuel Cell Electric Vehicle (FCEV).

The pure EV controls a motor through a motor controller such as an inverter as power is supplied from a battery, in order to achieve optimum efficiency and replace an engine with a motor. That is, it is a complete eco-friendly vehicle with no noxious gas discharge.

Figure 1:
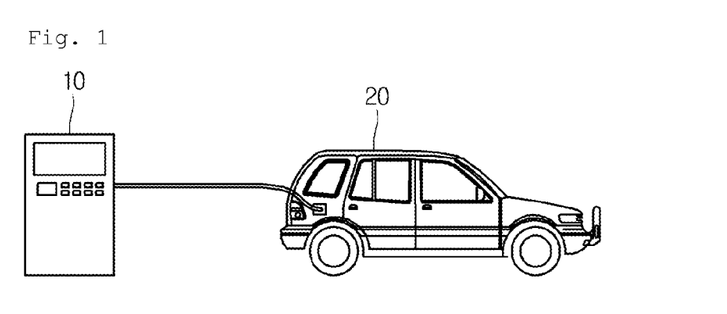
FIG. 1 is a view illustrating a related art charging system.

FIG. 1 is a view illustrating a related art charging system.

Referring to FIG. 1, the charging system includes a charging stand 10 and an EV 20 charging a battery using a power supplied from the charging stand 101 in connection with the charging stand 101.

The EV 20 controls a motor through a motor controller such as an inverter as power is supplied from a battery, in order to achieve optimum efficiency and replace an engine with a motor, so that it is a complete eco-friendly vehicle with no noxious gas discharge.

For this, the EV 20 includes a battery pack consisting of a plurality of battery cells to receive necessary power.

The charging stand 10 is connected to the EV 20, and supplies power to the battery in the EV 20 at the request thereof.

The charging stand 10 detects that the EV 20 is connected to a charging port, and according thereto, supplies power to the EV 20 through charging cable at the request of a user of the EV 20.

However, such a charging system performs a charging operation on the EV 20 without restriction if payment for charging the battery is made normally.

Therefore, the charging stand 10 may perform a charging operation on illegal vehicles such as stolen vehicles if payment is made. For this reason, it is difficult to effectively crack down illegal vehicles.

SUMMARY

Embodiments provide a charging stand, a charging system, and a charging method, which recognize an illegal vehicle by using the electronic license plate of a Radio Frequency IDentification (RFID) based vehicle and restricting charging the illegal vehicle.

Embodiments provide a charging stand, a charging system, and a charging method, which efficiently crack down on illegal vehicles such as stolen vehicles.

In one embodiment, a charging system for charging a vehicle includes: a charging stand for obtaining vehicle information from the vehicle and transmitting the obtained vehicle information to a management server, and supplying power to a battery equipped in the vehicle on the basis of the transmitted vehicle information; and the management server for determining a charging condition of the battery equipped in the vehicle by using the vehicle information transmitted through the charging stand, and transmitting charging information corresponding to the determined charging condition to the charging stand, wherein the charging stand receives the charging information transmitted through the management server, and supplying power to the battery on the basis of the charging condition corresponding to the received charging information.

In further another embodiment, a method of charging a vehicle includes: obtaining vehicle information from a vehicle connected for charging; determining whether the connected vehicle is a crackdown target by using the obtained vehicle information; determining a charging condition of the vehicle according to the determination result; and supplying power to a battery equipped in the vehicle on the basis of the determined charging condition.

The details of one or more embodiments are set forth in the accompanying drawings and the description below. Other features will be apparent from the description and drawings, and from the claims.

DETAILED DESCRIPTION OF THE EMBODIMENTS

Hereinafter, embodiments will be described in more detail with reference to the drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

The terms used in this specification are selected from currently widely used general terms in consideration of functions of the present invention, but may vary according to the intentions. Additionally, in certain cases, there may be terms that an applicant may arbitrarily select, and in this case, their meanings are described below. Accordingly, the terms used in this specification should be interpreted on the basis of substantial implications that the terms have and the contents across this specification not the simple names of terms.

Figure 2:
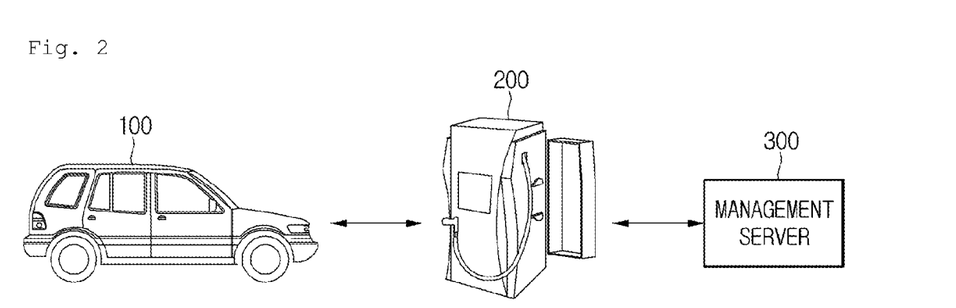
FIG. 2 is a view illustrating a configuration of a charging system according to an embodiment.

As shown in FIG. 2, the charging system includes a vehicle 100, a charging stand 200, and a management server 300.

The vehicle 100 controls a motor through a motor controller such as an inverter as power is supplied from a battery 130, in order to achieve optimum efficiency and replace an engine with a motor. That is, it is a complete eco-friendly vehicle with no noxious gas discharge.

The vehicle 100 stores original identification information, and includes a Radio Frequency IDentification (RFID) tag for transmitting the original identification information at the request of the charging stand 200. At this point, the RFID tag is connected to the battery 130, and is driven by the power supplied from the battery 130.

At this point, in order to crack down an illegal vehicle that illegally replaces a license plate, the vehicle 100 confirms whether the RFID tag was separated from the battery 130.

Accordingly, if the RFID tag was separated from the battery 130, the vehicle 100 stores separation history information according thereto, and transmits the separation history information in addition to the identification information stored in the RFID tag to the charging stand 200.

The identification information and the separation history information are vehicle information on the vehicle 100.

The vehicle information includes the identification information and the separation history information, and each will be described in detail below.

The charging stand 200 is connected to the vehicle 100, receives the identification information and the separation history information from the vehicle 100, and transmits the received identification information and separation history information to the management server 300.

Additionally, the charging stand 200 receives charging information on whether the identification information and the separation history information are normal through the management server 300, and supplies a charging current to the battery 130 of the connected vehicle 100 on the basis of the provided charging information.

The management server 300 receives the identification information and the separation history information on the vehicle 100 connected to the charging stand 200 through data communication with the charging stand 200, and determines whether the identification information and the separation history information are normal according thereto.

The management server 300 provides charging information that represents normal charging permission of the vehicle 100 to the charging stand 200 if the determined identification information and separation history information are normal.

Additionally, the management server 300 provides charging information that represents a charging condition (e.g., low speed charging or no charging) of the vehicle 100 to the charging stand 200 if the determined identification information and separation history information are abnormal.

For this, the management server 300 establishes a database by storing identification information on a vehicle classified as an illegal vehicle, and accordingly thereto, determines whether the identification information transmitted from the charging stand 200 is normal by using the identification information stored in the database.

Additionally, the management server 300 confirms the illegal modification of the vehicle by using the separation history information. That is, the management server 300 recognizes the separation history information as abnormal separation history information if a battery was separated from an RFID tag before, and recognizes the separation history information as normal separation history information if the battery was not separated from the RFID tag before.

Hereinafter, the electric vehicle charging system will be described in more detail with reference to the accompanying drawings.

Figure 3:
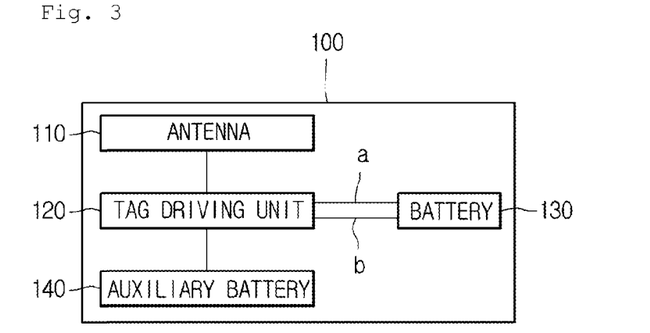
FIG. 3 is a view illustrating a configuration of a vehicle.

FIG. 3 is a view illustrating a configuration of a vehicle.

Referring to FIG. 3, the vehicle 100 includes an RFID tag consisting of an antenna 110 and a tag driving unit 120, a battery 130, and an auxiliary battery 140.

The antenna 110 performs RFID communication with an RFID reading unit equipped in the charging stand 200 to transmit identification information on the vehicle 100.

The tag driving unit 120 stores original identification information on the vehicle 100, and provides the stored identification information to the antenna 110 at the original information request of the RFID reading unit equipped in the charging stand 200.

The battery 130 is a battery for vehicle for storing electric energy in the vehicle 100. The battery 130 provides driving power to the antenna 110 and the tag driving unit 120.

The auxiliary battery 140 supplies driving power to the antenna 110 and the tag driving unit 120 instead of the battery 130 as the battery 130 is disconnected from the antenna 110 and the tag driving unit 120.

At this point, the tag driving unit 120 and the battery 130 are connected to each other through a first line a for supplying power and a second line b for confirming disconnection (separation).

The tag driving unit 120 monitors the second line b frequently in order to confirm that it is connected, that is, whether the tag driving unit 120 was separated from the battery 130.

Then, the tag driving unit 120 stores first separation history information on normal connection if the second line b is connected normally and stores second separation history information on abnormal connection if the second line b was disconnected before (that is, the tag driving unit 120 was separated from the battery 130 before).

Additionally, the tag driving unit 120 provides the separation history information in addition to the identification information to the antenna 110 at the request of the charging stand 200.

Accordingly, if a vehicle license plate is illegally modified, its information is stored and then transmitted later to the charging stand 200, so that charging of an illegally modified vehicle is prevented or its crackdown is made.

Figure 4:
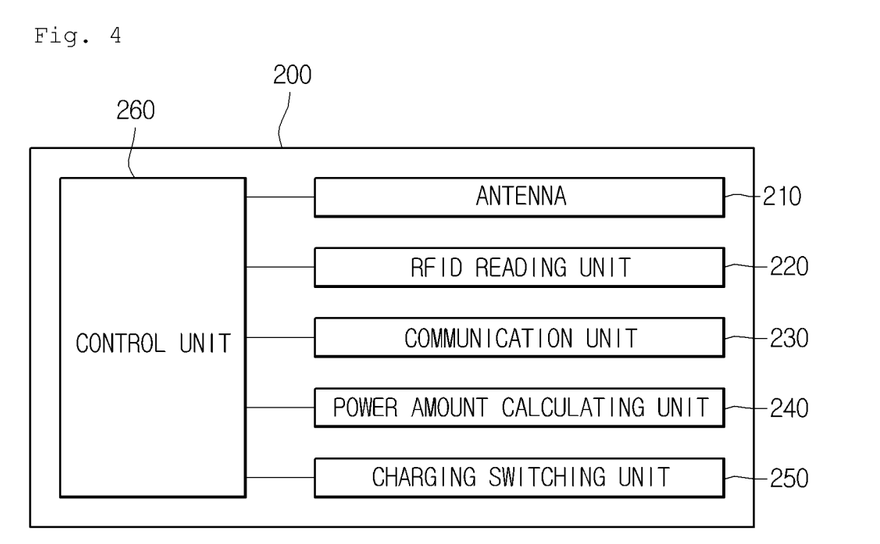
FIG. 4 is a view illustrating a configuration of a charging stand according to an embodiment.

FIG. 4 is a view illustrating a configuration of a charging stand according to an embodiment.

Referring to FIG. 4, the charging stand 200 includes an antenna 210, an RFID reading unit 220, a communication unit 230, a power amount calculating unit 230, a charging switching unit 250, and a control unit 260.

Additionally, the charging stand 200 further includes a connection part (not shown) connected to the battery 130 of the vehicle 100 in order to charge the battery 130 of the vehicle 100. The connection part may have a power supply plug for providing power supplied through a power supply unit (not shown) to the battery 130 of the vehicle 100.

The antenna 210 receives the identification information and the separation history information on the vehicle 100 through RFID communication with the RFID tag attached to the vehicle 100. At this point, the identification information may be the license plate number of the vehicle 100.

The RFID reading unit 220 receives the identification information and the separation history information received through the antenna 210, and delivers them to the control unit 260.

The communication unit 230 performs data communication with the management server 300 to transmit the identification information and the separation history information on the vehicle 100 to the management server 300, or receive charging information from the management server 300.

The power amount calculating unit 240 calculates the amount of power supplied to the battery 130 of the connected vehicle 100. That is, the power amount calculating unit 240 calculates an electric energy consumed through from a power terminal to a load terminal (e.g., an EV) during charging.

The charging switching unit 250 controls a current supplied to the battery 130 of the connected vehicle 100. That is, the charging switching unit 230 allows a current to be continuously supplied to the battery or cuts off the current. The charging switching unit 250 operates in response to a switching signal provided from the control unit 260.

Additionally, the charging stand 200 may further include an output unit (not shown). The output unit may be one of a sound output unit (e.g., a speaker) for outputting a sound signal and an image output unit for outputting an image signal.

That is, the output unit may display lines in charging, an idle charging station, an estimated time for charging, a charging progress, a charging amount, and custom information through tables and graphics. Additionally, data provided through the display unit may be used for a user to recognize a charging progress situation in advance through a large display unit in a charging station, and furthermore, may be transmitted to an EV internal system or a portable terminal of a customer to notify charging progress information.

The control unit 260 controls overall operations of the charging stand 200.

Especially, once vehicle is connected with the control unit, the control unit 260 performs RFID communication with the connected vehicle to control the antenna 210 and the RFID reading unit 220 in order to obtain the identification information and the separation history information on the vehicle.

Additionally, the control unit 260 obtains the identification information and the separation history information on the vehicle through the antenna 210 and the RFID reading unit 220, and then transmits the obtained information to the management server 300.

Additionally, the control unit 260 receives charge information on whether the identification information and the separation history information are normal through the communication unit 230, and controls the charging switching unit 250 to determine a charging condition of the vehicle 100 on the basis of the delivered charging information.

That is, if the charging information is first information that represents the identification information and the separation history information are normal, the control unit 260 controls the charging switching unit 250 to allow a normal charging current to be supplied to the battery 130 of the vehicle 100.

Additionally, if the charging information is second or third information that represents the identification information and the separation history information are abnormal, the control unit 260 controls the charging switching unit 250 to cut off a charging current supplied to the battery 130 of the vehicle 100 or to reduce a supply speed of the charging current.

That is, if the vehicle 100 is an illegally-modified vehicle, the control unit 260 cuts off the charging current to perform a no charging operation due to an illegal modification.

Additionally, if the vehicle 100 is an illegally-modified vehicle, the control unit 260 reduces a supply speed of the charging current. That is, the control unit 260 increases a time for charging the vehicle 100, which gives a police a chance to crack down an illegal vehicle during charging the vehicle 100.

At this point, according to a crackdown level of the vehicle 100, the vehicle 100 may not be charged or its charging speed may be adjusted.

That is, by dividing the crackdown level into certain stages, in the case of a high crackdown level of a vehicle, a charging speed is adjusted for crackdown, and in the case of a low crackdown level of a vehicle, a no charging operation is performed, so that a disadvantage due to illegal modification may occur.

Accordingly, the control unit 260 receives charging information corresponding to the second information if a vehicle has a high crackdown level, and receives charging information corresponding to the third information if a vehicle has a low crackdown level.

Moreover, the control unit 260 transmits position information on the vehicle to the management server 300 if the delivered charging information is the second information corresponding to a vehicle with a high crackdown level.

At this point, the position information on the vehicle is information relating to the position of the vehicle charging device 200, which includes one of an address or GPS information of the vehicle charging device 200.

Moreover, unlike this, the control unit 260 transmits the position information on the vehicle to the management server 300 if the delivered charging information corresponds to one of the second information and the third information.

Figure 5:
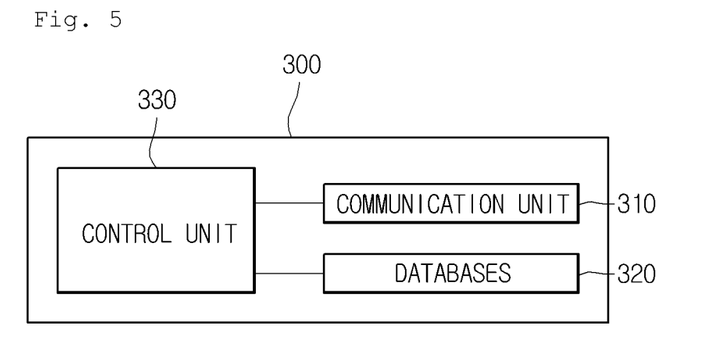
FIG. 5 is a view illustrating a configuration of a management server according to an embodiment.

FIG. 5 is a view illustrating a configuration of a management server according to an embodiment.

Referring to FIG. 5, the management server 300 includes a communication unit 310, a database 320, and a control unit 330.

The communication unit 310 receives identification information and separation history information on the vehicle from the charging stand 200 through data communication with the charging stand 200.

Additionally, the communication unit 310 transmits charging information corresponding to whether the identification information and the separation history information on the vehicle are normal to the charging stand 200.

The database 320 stores identification information on an illegal vehicle, i.e., a crackdown subject. Additionally, the database 320 may store vehicle identification information according to a crackdown level in a table.

Once the identification information and the separation history information on the vehicle are delivered through the communication unit 310, the control unit 330 determines whether the delivered identification information is included in crackdown target identification information in the database 320, and according thereto, determines the identification information is normal or not.

Then, if the identification information is included in the crackdown target identification information, the control unit 330 transmits charging information corresponding to the second or third information to the vehicle charging device 200 according to a crackdown level of the identification information.

Additionally, if the identification information is not included in the crackdown target identification information, the control unit 330 confirms the separation history information and according thereto, confirms whether the battery of the vehicle was separated from the RFID tag before.

Additionally, if the battery of the vehicle was not separated from the RFID tag before, the control unit 330 transmits charging information corresponding to the first information to the charging stand 200.

Additionally, if the battery of the vehicle was separated from the RFID tag before, the control unit 330 transmits charging information corresponding to the second or third information to the charging stand 200.

At this point, the control unit 330 requests the position information of the charging stand 200 or the vehicle 100 if the charging information corresponding to the second or third information is transmitted to the charging stand 200.

Additionally, once the position information is transmitted from the charging stand 200, the control unit 330 transmits the position information to an enforcement related organization in order to crack down the vehicle. At this point, the enforcement related organization may be an illegal vehicle crackdown organization.

According to the above embodiments, determination is made on whether power for charging is supplied by using identification information on a vehicle, so that the charging power use of an illegal vehicle may be prevented. Moreover, the position information of an illegal vehicle is provided to a management server, so that the illegal vehicle may be effectively cracked down.

Figure 6:
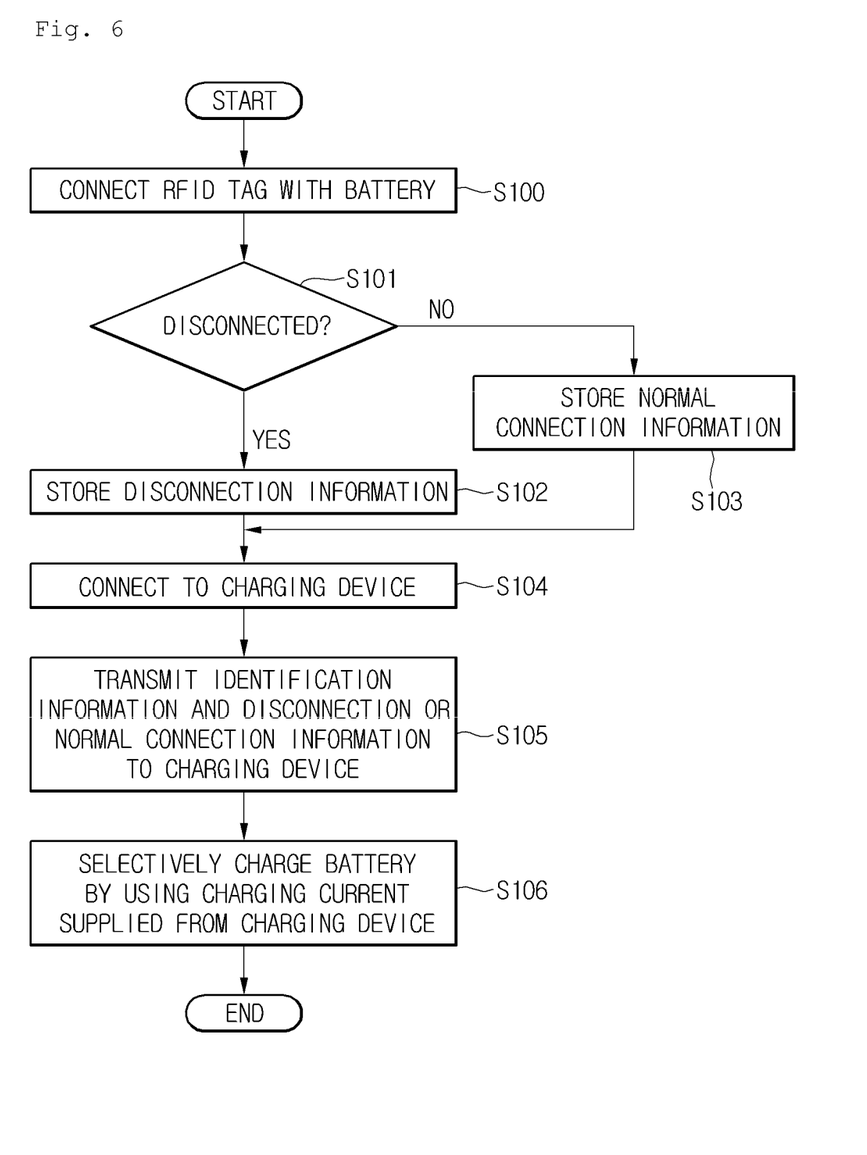
FIG. 6 is a flowchart illustrating an operation of a vehicle according to an embodiment.

FIG. 6 is a flowchart illustrating an operation of a vehicle according to an embodiment.

Referring to FIG. 6, in relation to an operation of a vehicle, the RFID tag is connected to the battery 130 in operation S100 first. The RFID tag includes the antenna 110 and the tag driving unit 120.

That is, the RFID tag is connected to the battery 130 through a first line, and according thereto, receives the power supplied from the battery 130. Additionally, the RFID tag is connected to the battery 130 through a second line, and confirms whether the RFID tag was separated from the battery 130 before according to the second line connection.

The tag driving unit 120 continuously monitors the second line connection, and determines whether the second line is connected or disconnected in operation S101.

On the basis of a determination result in operation S101, the tag driving unit 120 stores normal connection information on the second line in operation S103 if the second line is connected.

Additionally, on the basis of the determination result in operation S101, the tag driving unit 120 stores disconnection information on the second line in operation S102 if the second line is disconnected.

At this point, if the second is disconnected, the tag driving unit 120 and the antenna 110 receive the driving power from the auxiliary battery 140.

As the vehicle 100 is connected to the charging stand 200, the tag driving unit 120 provides the stored identification information and separation history information to the antenna 110 in operations S104 and S105 when transmission of the identification information and the separation history information (such as normal connection information and disconnection information) is requested from the charging stand 200.

That is, the tag driving unit 120 provides to the antenna 110 the identification information representing the license number of the vehicle 100 and the separation history information representing whether the second line is disconnected.

Then, according to a determination result on the basis of whether the identification information and the separation history information are normal, the battery 130 is charged using a charging current supplied from the vehicle charging device 200 in operation S106.

Figure 7:
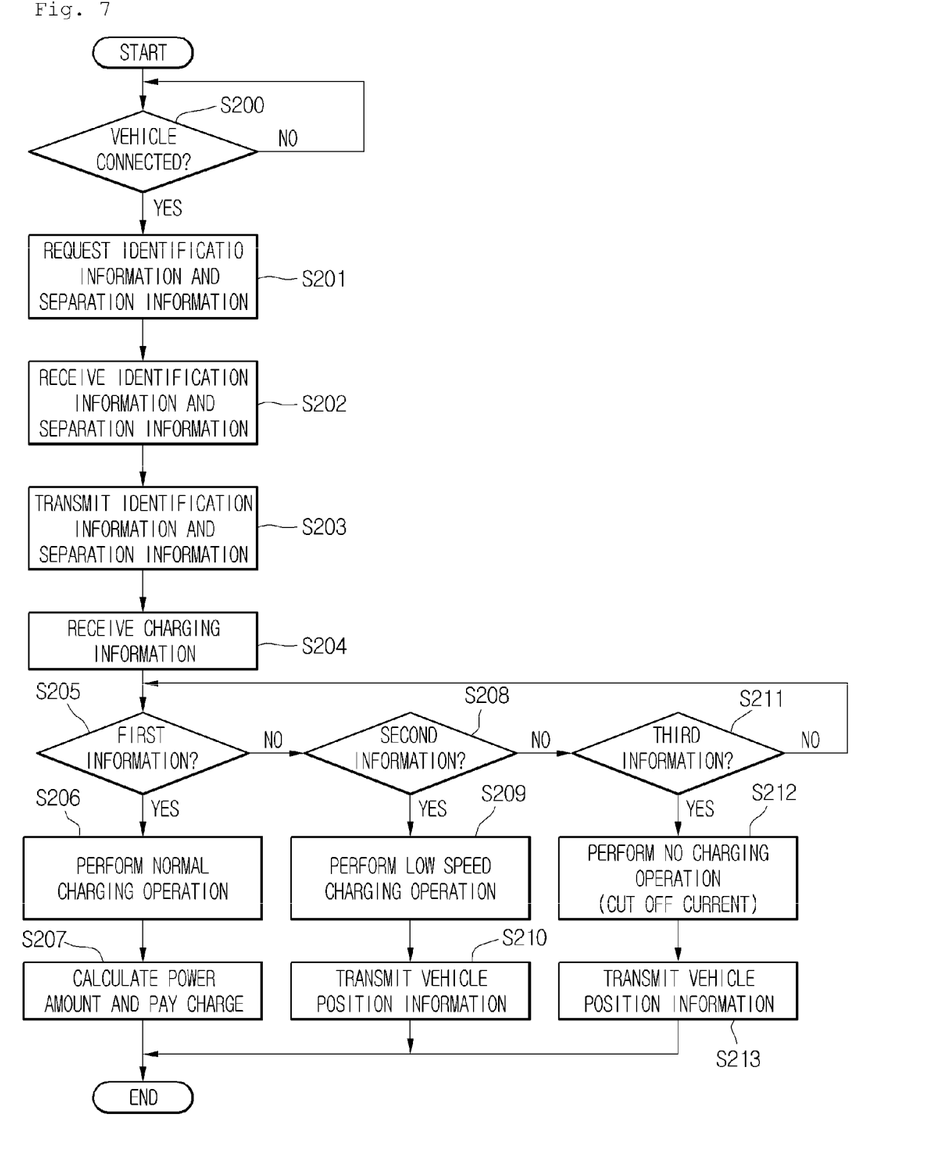
FIG. 7 is a flowchart illustrating an operation of a charging stand according to an embodiment.

FIG. 7 is a flowchart illustrating an operation of a charging stand according to an embodiment.

Referring to FIG. 7, the control unit 260 determines first whether the vehicle 100 that needs charging is connected to a connection part having at least one plug in operation S200.

On the basis of the determination result in operation S200, if the vehicle 100 is connected to the connection part, the control unit 260 drives the antenna 210 and the RFID reading unit 220 in order to request the vehicle 100 of the transmission of identification information and separation history information in operation S201.

The antenna 210 and the RFID reading unit 220 receive the identification information and the separation history information transmitted from the vehicle 100 in operation S202.

Additionally, the identification information and the separation history information received through the RFID reading unit 220 and the antenna 210 are transmitted to the management server 300 through the communication unit 230 in operation S203.

Additionally, the communication unit 230 receives charging information corresponding to the identification information and the separation history information transmitted from the management server 300 in operation S204.

The charging information includes a charging condition. The charging condition includes information on a charging speed and a charging permission.

The control unit 260 confirms the received charging information, and accordingly, determines whether charging information corresponds to the first information in operation S205.

On the basis of the determination result in operation S205, if the charging information corresponds to the first information, the control unit 260 controls the charging switching unit 250 to allow a normal charging current to be supplied to the battery 130 of the vehicle 100 in operation S206.

At this point, the power amount calculating unit 240 calculates the amount of power supplied to the battery 130 of the connected vehicle 100 and calculates a charging fee according to a rate in operation S207.

Additionally, on the basis of the determination result in operation S205, if the charging information does not correspond to the first information, the control unit 260 determines whether the charging information corresponds to the second information in operation S208.

Moreover, if the charging information corresponds to the second information, the control unit 260 adjusts the amount of current supplied to the battery 130 of the vehicle 100 in order to adjust a charging time of the battery 130 in operation S209.

That is, the control unit 260 controls the charging switching unit 250 in order for the battery 130 to be charged at a low speed.

Moreover, the control unit 260 transmits the position information on the vehicle 100 to the management server 300 if the charging information corresponds to the second information in operation S210.

Additionally, on the basis of the determination result in operation S208, if the charging information does not correspond to the second information, the control unit 260 determines whether the charging information corresponds to the third information in operation S211.

Moreover, if the charging information corresponds to the third information, the control unit 260 cuts off a current supplied to the battery 130 of the vehicle 100 and stops charging the battery 130 in operation S212.

Moreover, the control unit 260 transmits the position information on the vehicle 100 to the management server 300 if the charging information corresponds to the third information in operation S213.

Figure 8:
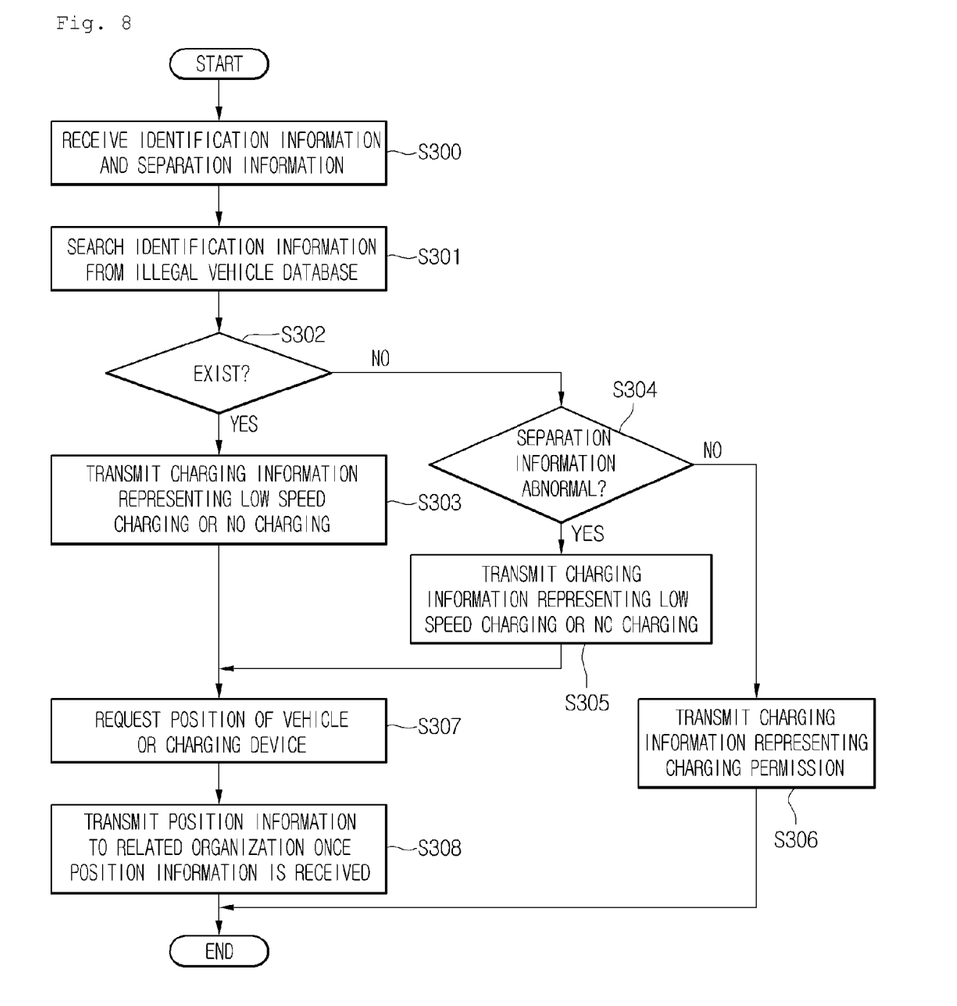
FIG. 8 is a flowchart illustrating an operation of a management server according to an embodiment.

FIG. 8 is a flowchart illustrating an operation of a management server according to an embodiment.

Referring to FIG. 8, the management server 300 receives the identification information and the separation history information transmitted from the charging stand 200 in operation S300.

Then, the management server 300 searches the received identification information from the crackdown vehicle identification information stored in the database 320 in operation S301.

Additionally, the management server 300 determines whether the received identification information corresponds to a crackdown vehicle on the basis of the search result of the identification information in operation S302.

On the basis of the determination result in operation S302, if the received identification information corresponds to a crackdown vehicle, the management server 300 transmits charging information representing a low speed charging or no charging of the vehicle 100 in operation S303.

That is, as the vehicle 100 corresponds to a crackdown vehicle such as illegally-modified or stolen vehicle, the management server 300 transmits charging information corresponding to the second or third information to the charging stand 200.

Additionally, on the basis of the determination result in operation S302, if the received identification information does not correspond to the crackdown vehicle, it is determined whether the RFID tag was separated from the battery 130 in the vehicle 100 in operation S304 by confirming the received separation history information in operation S304.

On the basis of the determination result in operation S304, if the RFID tag was separated from the battery 130 before in the vehicle 100, the management server 300 transmits charging information representing a low speed charging and no charging of the vehicle 100 to the charging stand 200 in operation S305.

Additionally, on the basis of the determination result in operation S304, if the RFID tag was not separated from the battery 130 before in the vehicle 100, the management server 300 transmits charging information on normal charging permission of the vehicle 100 to the charging stand 200 in operation S306.

Furthermore, if the charging information representing a low speed charging or no charging is transmitted to the charging stand 200, the management server 300 transmits a request signal for requesting the position information of the vehicle to the charging stand 200 in operation S307.

Once the position information of the vehicle 100 is received from the charging stand 200 according to the request signal, the management server 300 transmits the position information of the vehicle 100 to a vehicle crackdown related organization in order to crack down the vehicle 100 in operation S308.

According to the above embodiments, determination is made on whether power for charging is supplied by using identification information on a vehicle, so that charging power use of an illegal vehicle may be prevented. Moreover, the position information of an illegal vehicle is provided to a management server, so that the illegal vehicle may be effectively cracked down.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charging system for charging a vehicle, the system comprising:
   a charging stand for obtaining vehicle information from the vehicle, transmitting the obtained vehicle information to a management server, and supplying power to a vehicle battery according to the obtained vehicle information;
   a Radio Frequency Identification (RFID) tag connected to the battery via a plurality of lines, one of the plurality of lines a power supply line for receiving driving power and another of the plurality of lines a detection line for detecting whether the RFID tag is separated from the battery; and
   the management server for determining a charging condition of the battery by using the transmitted vehicle information, and transmitting charging information corresponding to the determined charging condition to the charging stand,
   wherein the charging stand receives the transmitted charging information, and supplies power to the battery according to the corresponding charging condition,
   wherein the vehicle information comprises separation history information according to whether the RFID tag was separated from the battery, and
   wherein the separation history information is detected according to whether the detection line is connected or disconnected.

2. The charging system according to claim 1, wherein the vehicle information further comprises identification information for identifying the vehicle; and
   the charging stand obtains the identification information from the RFID tag.

3. The charging system according to claim 2, wherein the management server is further for:
   determining whether the vehicle corresponds to a crackdown target by using the identification information and the separation history information; and
   determining the charging condition according to the determination.

4. The charging system according to claim 3, wherein the management server comprises a database for storing the identification information.

5. The charging system according to claim 1, wherein the charging condition is at least a normal charging condition, a low speed charging condition, or no charging condition.

6. The charging system according to claim 5, wherein the charging stand is further for transmitting position information related to the vehicle to the management server if the charging condition is the low speed charging condition or the no charging condition.

7. A charging stand comprising:
   a connection part having a plug for supplying power to a vehicle battery;
   a Radio Frequency Identification (RFID) reading unit for obtaining vehicle information from the vehicle by communicating with an RFID tag attached to the battery;
   a transmission unit for transmitting the obtained vehicle information to a management server; and a control unit for controlling the transmission unit to transmit the obtained vehicle information, for receiving charging information according to whether the transmitted vehicle information is normal, and for charging the vehicle connected to the connection part according to a charging condition corresponding to the received charging information, wherein the vehicle information comprises separation history information according to whether the RFID tag is separated from the battery, and wherein the separation history information is used for determining whether the vehicle corresponds to a crackdown target according to whether the RFID tag was separated from the battery.

8. The charging stand according to claim 7, further comprising a switching unit for selectively cutting off power supplied to a battery in response to a control signal from the control unit.

9. The charging stand according to claim 7, wherein the vehicle information further comprises identification information related to the vehicle that is stored in the RFID tag.

10. The charging stand according to claim 7, wherein the charging information is at least a normal charging condition, a low speed charging condition, or a no charging condition; and the control unit is further for controlling a supply state of the power according to the charging condition.

11. The charging stand according to claim 10, wherein the control unit is further for transmitting position information related to the vehicle to the management server if the charging condition is the low speed charging condition of the no charging condition.

12. A method of charging a vehicle, the method comprising:

obtaining vehicle information from the vehicle;

determining whether the vehicle is a crackdown target by using the obtained vehicle information;

determining a charging condition of the vehicle according to the determination; and supplying power to a vehicle battery according to the determined charging condition,.

wherein obtaining the vehicle information comprises obtaining separation history information according to whether a Radio Frequency IDentification (RFID) tag is separated from the battery.

13. The method according to claim 12, wherein obtaining the vehicle information further comprises obtaining identification information related to the vehicle from the RFID.

14. The method according to claim 13, wherein determining whether the vehicle is a crackdown target comprises:

determining whether the obtained identification information corresponds to the crackdown target by using previously-stored crackdown target identification information; and determining whether the RFID tag was separated from the battery by using the obtained separation history information.

15. The method according to claim 12, wherein the charging condition is at least a normal charging condition, a low speed charging condition, or a no charging condition; and supplying the power comprises adjusting an amount of power supplied to the battery according to the charging condition or cutting off the supplied power.

16. The method according to claim 15, further comprising transmitting position information related to the vehicle externally if the charging condition is the low speed charging condition or the no charging condition.

* * * * *